(12) United States Patent
Oleniczak

(10) Patent No.: US 6,876,890 B1
(45) Date of Patent: Apr. 5, 2005

(54) METHOD AND SYSTEM FOR CUSTOMER-SPECIFIC FIELD TESTING IN A WIRELESS COMMUNICATION SYSTEM

(75) Inventor: Kevin J. Oleniczak, Wheaton, IL (US)

(73) Assignee: Sprint Spectrum L.P., Overland Park, KS (US)

( * ) Notice: Subject to any disclaimer, the term of this patent is extended or adjusted under 35 U.S.C. 154(b) by 325 days.

(21) Appl. No.: 10/062,983

(22) Filed: Jan. 31, 2002

(51) Int. Cl.[7] .............................................. G05B 19/18
(52) U.S. Cl. ............................ 700/65; 700/52; 700/53; 700/66; 379/18; 379/21; 379/26; 455/3.01; 455/3.02; 455/406.2; 702/62; 702/185
(58) Field of Search .............................. 700/1, 2–5, 52, 700/53, 65, 66; 455/110, 115.3, 3.01, 226.2, 3.02, 3.03, 3.06, 400, 406.2, 405, 412.1, 412.2, 419, 420, 423, 139, 134–135; 340/539.21; 725/17, 18; 379/26, 21, 18; 702/62, 185

(56) References Cited

U.S. PATENT DOCUMENTS

| | | | | |
|---|---|---|---|---|
| 5,572,438 A | * | 11/1996 | Ehlers et al. ............... 700/295 |
| 5,699,402 A | * | 12/1997 | Bauer et al. ............. 379/29.09 |
| 5,894,422 A | * | 4/1999 | Chasek ........................ 700/291 |
| 5,956,658 A | * | 9/1999 | McMahon .................... 702/83 |
| 5,958,012 A | * | 9/1999 | Battat et al. ................. 709/224 |
| 6,088,659 A | * | 7/2000 | Kelley et al. ................. 702/62 |
| 6,178,362 B1 | * | 1/2001 | Woolard et al. ............. 700/295 |
| 6,484,316 B1 | * | 11/2002 | Lindberg ...................... 725/17 |
| 6,510,152 B1 | * | 1/2003 | Gerszberg et al. ........... 370/352 |
| 6,594,621 B1 | * | 7/2003 | Meeker ....................... 702/185 |
| 6,671,671 B1 | * | 12/2003 | Garland et al. ........... 704/270.1 |
| 2002/0033416 A1 | * | 3/2002 | Gerszberg et al. ........... 235/380 |
| 2003/0025612 A1 | * | 2/2003 | Holmes et al. ......... 340/870.02 |

* cited by examiner

*Primary Examiner*—Ramesh Patel

(57) ABSTRACT

A method and system for collecting test data at a customer premises site. A computer receives a customer-specific input record that defines test measurements to be taken at the customer premises site. The computer then directs a test meter to take the designated measurements and receives the measured values form the test meter. In turn, the computer provides a customer-specific output report, which indicates the measured values taken at the customer premises site. The method and system facilitates better control over the taking and reporting of signal quality measurements.

12 Claims, 6 Drawing Sheets

METHOD AND SYSTEM FOR CUSTOMER-SPECIFIC FIELD TESTING IN A WIRELESS COMMUNICATION SYSTEM

BACKGROUND

1. Field of the Invention

The present invention is directed to telecommunications and, more particularly, to methods and systems for testing network conditions in a wireless communication system. The invention is particularly useful in testing radio frequency (RF) signal strength upon installation of an MMDS (Multi-channel Multipoint Distribution Service) transceiver dish at customer premises. However, the invention is equally applicable to test other parameters and in other scenarios as well.

2. Description of Related Art

MMDS can be used to provide broadband wireless connectivity to customer premises. In an MMDS system, a transmitting tower is placed at a high elevation and provides radio connectivity to multiple sites with a specified radius. At each site, a transceiver antenna (typically a dish) is installed on or alongside a building, at a fixed location, to receive signals downstream from the tower and to send signals upstream to the tower.

MMDS operates in the 2.1 to 2.7 GHz radio frequencies, with data rates up to 10 Mbps. However, each customer premises site will typically be assigned only a set pair of frequencies within this range. One frequency of the pair will be used for downstream transmissions to the site, and the other frequency will be used for upstream transmissions from the site.

MMDS may or may not require line-of-sight transmission between the customer premises site and the tower. However, in any event, obstacles such as land, buildings and other transmission systems between the site and the tower can interfere with MMDS transmission on certain frequencies and can thereby impact the quality of service. (Further, if signal quality diminishes for one MMDS user, that user might responsively increase transmission power, which could then adversely interfere with transmissions to and from other MMDS users.) Consequently, when a technician installs an MMDS dish at a customer premises site, a need exists to verify that the dish can adequately communicate with the tower.

Tools exist to measure the downstream signal strength at an MMDS customer premises site. For instance, Sencore, Inc. manufactures an installers-meter under model number QAM-B 962H. (See http://www.sencore.com/products/qamb962h.htm). An installation technician can direct such a tool to measure signal strength at particular frequencies, and the technician can then manually log the signal strength measurements made at those frequencies. In turn, the technician can then send those measurements to a main office. Unfortunately, however, this process presents opportunities for mistake or intentional error (e.g., measuring at the wrong frequency and/or recording the wrong results). Therefore, a need exists for an improved system.

SUMMARY

According to the exemplary embodiment, a computer (e.g., a notebook PC) will be programmed with a software application that (i) receives a customer-specific record indicating an MMDS frequency (e.g., downstream frequency) to test at a customer premises site, (ii) outputs a control signal to cause a test meter to measure signal strength at the customer premises, (iii) receives the signal strength measure from the test meter, and (iv) outputs a customer-specific record indicating the measurement taken at the site.

In operation, a technician at an MMDS installation site may couple the computer with a test meter and invoke the application. The application will then cause the meter to take a set of desired signal quality measurements specific for the user/site at issue, and the application will record the measurements. In turn, the application may then output the customer-specific output record to a reporting site, preferably sending the output record to a central database to be logged and analyzed further.

Thus, in one respect, an exemplary embodiment of the invention may take the form of a method for collecting test data at a customer premises site. The method may involve (i) receiving into a computer a customer-specific input record that indicates at least one data point to measure at the customer premises site, (ii) applying the computer to instruct a test meter to measure the at least one data point at the customer premises site and to then receive from the test meter a value of the at least one data point as measured at the customer premises site, and (iii) outputting from the computer a customer-specific output record that indicates the value of the at least one data point as measured at the customer premises site.

In another respect, an exemplary embodiment may take the form of a method for providing signal strength measurement at an MMDS customer premises site. The method may involve (i) receiving into a computer a customer-specific input record that indicates a downstream MMDS frequency assigned to the customer premises site, (ii) applying the computer to instruct a test meter to measure signal strength at the downstream MMDS frequency at the customer premises site and to then receive from the test meter an indication of the measured signal strength, and (iii) outputting from the computer a customer-premises output record that indicates the signal strength measured at the downstream MMDS frequency at the customer premises site.

In this regard, the process of applying the computer to instruct a test meter to instruct a test meter to measure signal strength at the downstream MMDS frequency at the customer premises site can involve (i) generating in the computer a macro script that is executable by the test meter to measure the signal strength and (ii) transferring the macro script from the computer to the test meter. That way, the test meter may then execute the signal macro so as to measure the signal strength. Alternatively, the computer can more directly command the test meter to carry out a given measurement and/or to take other actions (e.g., through an API defined by the meter), rather than providing the meter with a macro script.

In the exemplary embodiment, the computer may also receive from the test meter an indication of the geographic coordinates where the signal strength is measured. Alternatively, the computer may receive the geographic coordinates in some other fashion, such as from a discrete geographic-positioning device coupled with the computer or from a positioning module integrated into the computer. Regardless of the source from which the computer obtains the geographic coordinates, the computer may conveniently include in the customer-specific output record an indication of the geographic coordinates as well.

Further, the process of outputting the customer-premises output record from the computer can involve sending the customer-specific output record to a remote server via a communication path that includes a wireless link. For instance, the computer can include or be linked with a wireless communication module (e.g., a CDMA PC-card) through which it can engage in data communications with the remote server. And the remote server may compile the data that it receives from the computer.

In another respect, an exemplary embodiment of the invention may take the form of a computer-readable medium (such as a disk, memory, or other storage medium) containing a stored set of instructions that are executable by a processor to carry out the functions of a method as described above.

In yet another respect, an exemplary embodiment of the invention may take the form of a method of collecting test data at a customer premises site. The method may involve (i) receiving into a computer a customer-specific input record that indicates at least one test data measurement to take at the customer premises site, (ii) operating the computer to produce a control signal for causing a test meter to take the at least one test data measurement, (iii) providing the control signal from the computer to the test meter, so that the test meter can then take the test data measurement at the customer premises site, pursuant to the control signal, (iv) providing from the test meter to the computer an indication of the test data measurement, and (v) outputting from the computer a customer-specific output record that indicates the test data measurement taken at the customer premises site.

In this method, the test data measurement can be a measurement of signal strength at a downstream frequency assigned to the customer premises site. And the control signal may be a macro that is executable by the test meter to cause the test meter to take the at least one test data measurement. Further, again, the process can involve providing from the test meter to the computer an indication of geographic coordinates where the test data measurement is taken at the customer premises site, and the customer-specific output record can then include an indication of the geographic coordinates. Still further, the customer-specific output record can include an identification of the test meter, as well as other sorts of information.

In still a further respect, an exemplary embodiment of the invention may take the form of a method of collecting test data from customer-premises sites. The method may involve loading into a computer a number of customer-specific input records, each of which indicates (i) a respective customer-premises site where signal strength is to be measured and (ii) a respective frequency on which the respective customer-premises site has been assigned to receive wireless communications. And additionally, the method may involve, for each of the customer-specific input records, operating the computer (i) to instruct a test-meter to measure received signal strength at the respective customer-premises site on the respective frequency, (ii) to receive from the test-meter measurement data indicative of the received signal strength at the respective customer-premises site, and (iii) to report the measurement data to a remote location via a communications link (such as a path that includes a wireless link).

In the exemplary embodiment, each of the customer-specific input records may also include an appointment time of when a technician is to be at the respective customer-premises site. In that case, the method may also involve operating the computer to present a schedule of appointment times at respective customer-premises sites throughout a day.

Similarly, each of the customer-specific input records may also include an address of the respective customer-premises site. In that case, the method may also involve operating the computer to present a map of respective customer-premises sites at which measurements are to be taken throughout the day.

And in still another respect, an exemplary embodiment of the invention may take the form of a machine (e.g., a computer), which includes a processor, data storage, and machine language instructions stored in the data storage and executable by the processor to perform a number of functions. The functions may include (i) receiving a customer-specific input record that indicates a downstream MMDS frequency assigned to a customer premises site, (ii) instructing a test meter to measure signal strength at the downstream MMDS frequency at the customer premises site, (iii) thereafter receiving from the test meter an indication of the measured signal strength; and (iv) outputting a customer-premises output record that indicates the measured signal strength. Further the process of outputting the customer-premises output record may include sending the customer-premises output record via a communications link to a remote server to facilitate data compilation and analysis.

These as well as other aspects and advantages of the present invention will become apparent to those of ordinary skill in the art by reading the following detailed description, with appropriate reference to the accompanying drawings.

BRIEF DESCRIPTION OF THE DRAWINGS

An exemplary embodiment of the present invention is described herein with reference to the drawings, in which.

DETAILED DESCRIPTION OF AN EXEMPLARY EMBODIMENT

Figure 1:
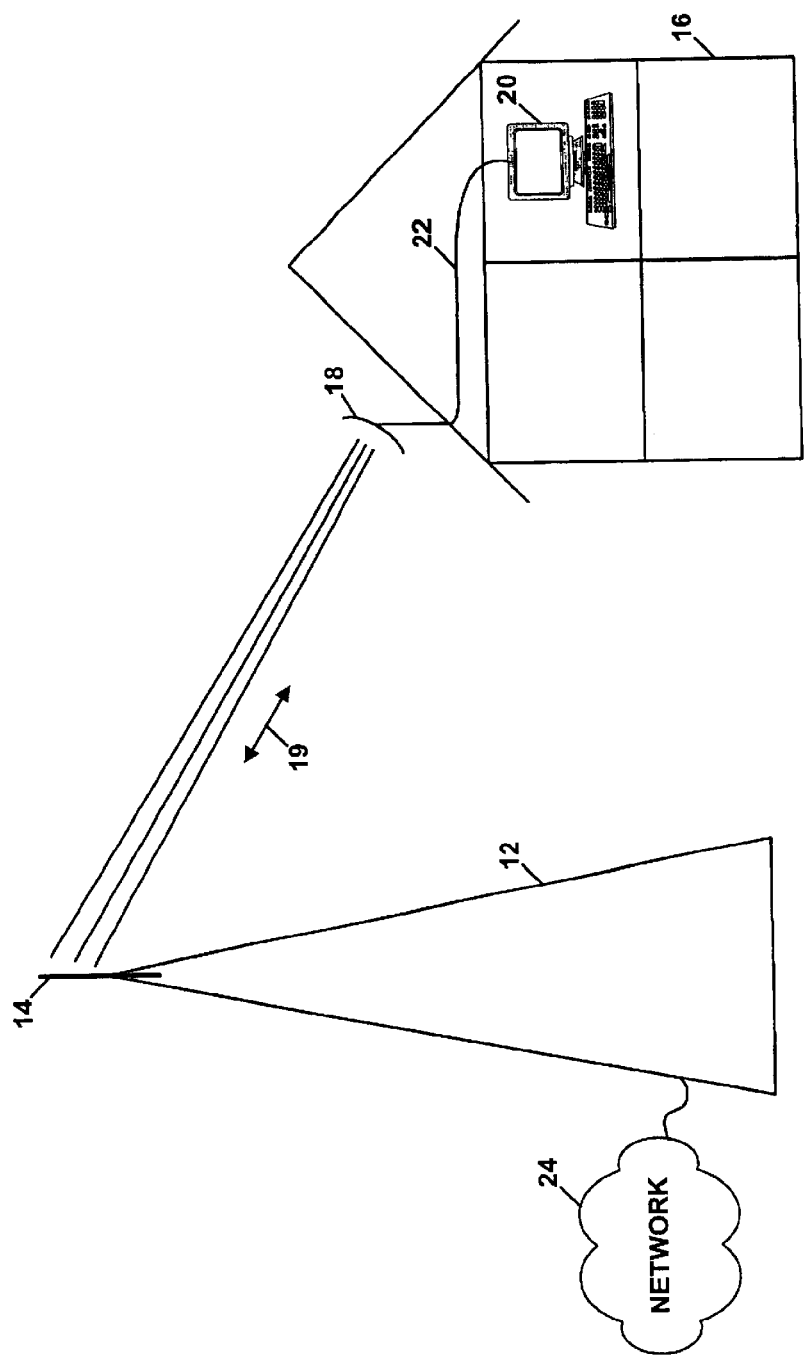
FIG. 1 is a block diagram depicting an MMDS system.

Referring to the drawings, FIG. 1 generally depicts an MMDS system. As shown in FIG. 1, a transmitting tower 12 is typically placed at a high elevation and includes an antenna 14, which produces a radiation pattern that defines a coverage area of the tower. An authorized site within the coverage area may then be equipped with a corresponding antenna so as to be able to exchange signals with the MMDS tower.

FIG. 1 depicts as a representative site a house 16 having an MMDS antenna dish 18 installed on its roof. Alternatively, the dish might be installed elsewhere, such on the side of the house or on a separate tower adjacent to the house. Dish 18 functions to communicate with MMDS antenna tower 12 via a link 19, receiving signals downstream from the tower and sending signals upstream to the tower.

In the arrangement shown in FIG. 1, house 16 contains a computer (or other endpoint device) 20, which is coupled to the MMDS dish 18 by a suitable link such as a coaxial cable 22. (Intermediate devices or arrangements may be present as well.) Further, MMDS tower 12 is preferably coupled to a broadband network 24 such as the Internet. Thus, computer 20 may communicate with entities on network 24 through a communication path comprising cable 22, dish 18, link 19 and tower 12. This arrangement thereby provides broadband network connectivity for a user of computer 20.

In an ideal arrangement, link 19 would perfectly carry signals between tower 12 and dish 18, with no degradation in signal quality. However, as noted above, obstructions (not shown) such as land, trees, other buildings and other transmission systems between the site and the tower can interfere with the MMDS transmission (and, in turn, with other MMDS transmissions). Therefore, as noted above, a need exists to ensure that dish 18 can adequately communicate with tower 12.

When a technician visits a customer site to initially install an MMDS dish, the technician can apply a test meter to test signal strength at the position where the MMDS dish will be installed. To do this, a dish may be attached to the end of a long fiberglass rod and held up to the necessary spot. A cable (typically coaxial) will then extend down from the dish and be coupled with the test meter. Upon activation, the test meter may then measure the strength of signals being received by the dish at the test position.

Alternatively, when a technician visits a customer site to maintain an existing (already-installed) MMDS dish, the technician may similarly run a cable from that existing dish to the test meter and take signal strength measurements.

In turn, the technician can make a note of those signal strength measurements and send the measurements to a main office for analysis. However, as further noted, this process presents opportunities for mistake or intentional error.

According to the exemplary embodiment, the process of measuring and reporting signal quality can be automated through use of a method and system that assists the technician and that helps ensure accuracy of the measurements.

1. Overview

Generally speaking, in accordance with the exemplary embodiment, a computer (e.g., a notebook PC) may be programmed with a software application that (i) receives a customer-specific record indicating an MMDS frequency (e.g., downstream frequency) and/or other data point(s) to test at a customer premises site, (ii) outputs a control signal to cause a test meter to measure signal strength at the customer premises, (iii) receives the signal strength measure from the test meter, and (iv) outputs a customer-specific record indicating the measurement taken at the site.

In operation, at the beginning of a work day, a technician can load into the application (e.g., from a remote access server at main office) a set of customer-specific input records for the day. Each customer-specific input record may have a corresponding customer identifier (e.g., account number) and may define an address (preferably geo-coded) of a customer premises site and a downstream MMDS frequency that has been assigned to the site. Further, the record may define an appointment time, when the technician is to visit the site for installation. Through a suitable graphical user interface, the program may then display a schedule and map, indicating where the technician should be throughout the day.

When the technician arrives at a given site, the technician may connect the computer with the test meter (e.g., through a USB, parallel or serial port or through a proprietary port). And the technician may then select an indication of the customer account or site at issue. In response, the application may then retrieve from the customer-specific input record for that account an indication of the downstream frequency assigned to the site. In turn, the application may output a control signal that will cause the meter to measure signal strength at the indicated frequency.

In the exemplary embodiment, the control signal may be one or more direct commands to the test meter, each of which instructs the meter to take a particular measurement or to take some other defined action (similar to if a user had pressed a button on the meter to cause the meter to take a designated action.) Alternatively, the control signal may be more of a macro, or script, that can be loaded into memory on the meter and executed by the meter so as to cause the meter to take one or more designated measurements. (Ideally, such a macro would be written in a standard language, such as XML. However, more likely, the test meter will define a proprietary scripting language to which the macro provided by the computer will have to comply.)

Pursuant to the control signal, the test meter will thus test downstream signal strength at the position where an MMDS dish has been installed or will be installed. And the meter may then record the measured signal strength in its memory.

Thereafter, if the test meter remains coupled with the computer, the test meter may automatically report the measurement data to the computer or may report the measurement data to the computer in response to a triggering event (such as instruction by the technician). Alternatively, if the technician had de-coupled the test meter from the computer, the technician may then re-couple the test meter and computer and, similarly the test meter may report the measurement data autonomously or in response to a triggering event.

In the exemplary embodiment, the test meter and/or the computer may also be equipped with or connected to a GPS receiver, which provides an indication of the geographic location (e.g., latitude/longitude) where the measurement is taken, as well as a timestamp indicating when the measurement is taken. If the test meter includes (or accesses) the GPS receiver, the test meter may record the location and timestamp together with the measurement data and/or may report the location and timestamp together with the measurement data to the computer. On the other hand, if the computer includes (or accesses) the GPS receiver, then the computer may record the location and timestamp information together with the measurement data that the computer receives from the test meter.

In turn, the application on the computer may automatically establish a customer-specific output record. The customer-specific output record will preferably identify the customer and provide indications of the downstream signal strength, the location of the measurement, and the date and time when the measurement was taken. However, it may take other forms as well.

In an alternative arrangement, the function of the computer can be integrated as part of the test meter, in the form of a more intelligent computerized test meter, or enhanced test meter. As such, customer-specific input records could be loaded directly into the computerized test meter, and a processor in the test meter could execute the application (when invoked) to take the designated measurements and to generate the customer-specific output record.

The technician may then direct the application to send the customer-specific output record to a main office (again, through communication with a remote access server at the main office, or through some other means). There, the customer-specific data can be analyzed, and any desired follow up action can be taken.

1. Exemplary Architecture

Figure 2:
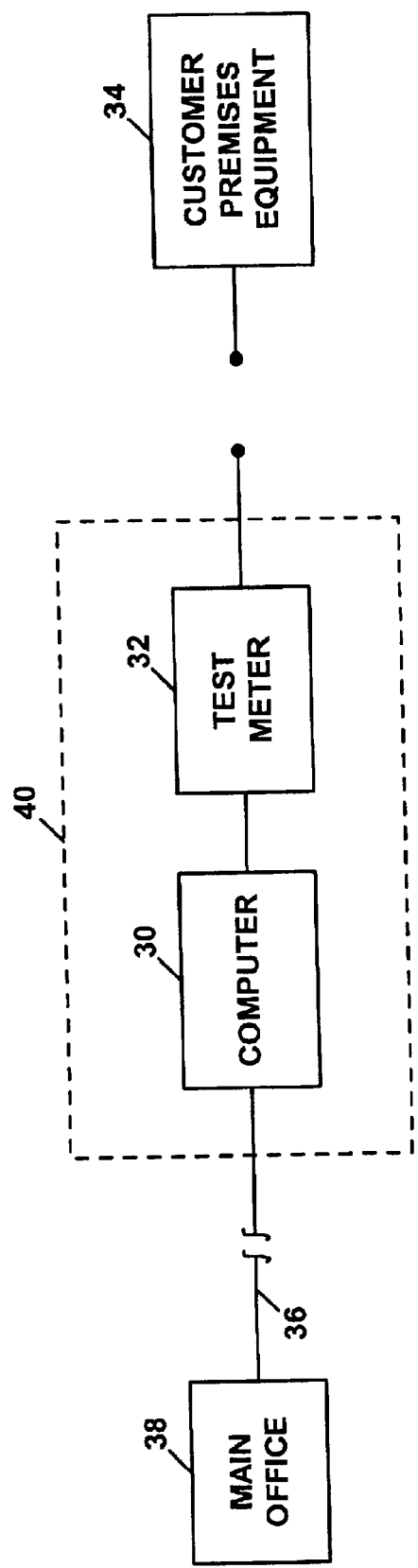
FIG. 2 is a block diagram of an arrangement for carrying out the exemplary embodiment.

Referring next to FIG. 2, a simplified block diagram is shown, illustrating one possible arrangement of this system. As shown in FIG. 2, a computer 30 is coupled with a test meter 32 (such as a Sencore meter, for instance), through a suitable communications port. (For instance, the test meter 32 may have a proprietary or standard port of some sort, and a corresponding cable may then be provided to link between that port and an I/O port on computer 30. In turn, the test meter then functions to measure signal quality at customer premises equipment 34.

As further shown, computer 30 may be coupled via a link 36 with a main office 38 (e.g., with a server at the main office). As such, link 36 can take various forms. Further, link 36 may represent multiple different links, possibly one link used for downloading customer-specific input records from the main office to the computer, and another link used for reporting customer-specific output records from the computer to the main office. Alternatively, link 36 might be a single link.

Link 36 can be a wireless and/or landline link suitable for carrying data between computer 30 and main office 38. For example, link 36 could be a landline network connection, through the public switched telephone network (PSTN) and/or through a packet-switched network such as the Internet. As another example, link 36 could include a wireless connection. For instance, computer 30 might include a cellular or PCS module that facilitates communication via an air interface with a radio access network (such as the Sprint PCS network), and the radio access network can in turn provide connectivity (e.g., through the PSTN or the Internet) to main office 38.

Preferably, such a wireless link would provide 3G or later data connectivity. For instance, the PCS module may establish a data link according to the industry standard "point-to-point protocol" (PPP) with a packet data serving node (PDSN), which then provides connectivity with the Internet. A remote access server at the main office may then sit on the Internet as well so that the PCS module can communicate via the PPP link and Internet with the remote access server. But other arrangements are possible as well.

As indicated above, computer 30 and test meter 32 may alternatively be integrated together into a single device. FIG. 2 depicts such a device as an enhanced test meter 40. Enhanced test meter 40 would maintain many of the functions of computer 30 and test meter 32, but could be more efficient, at least because it could alleviate the need to physically couple a computer with a test meter. Further, the enhanced device can conveniently include a single processor (rather than separate processors for the computer and the test meter), which could reduce cost as well.

It should be understood that the arrangement shown in FIG. 2 may not exist at all times or indeed at any time in particular. Rather, the figure serves to illustrate interconnections and relationships that may exist at various times between various components in the exemplary embodiment.

For example, computer 30 might not be connected to link 36 while the computer is connected to test meter 32. Alternatively (depending on what type of link 36 is provided, for instance), computer 30 might always be connected (wired or wirelessly) with link 36. And as another example, test meter 32 might not be connected with computer 30 when test meter 32 is positioned to take measurements at CPE 34. Or, alternatively, it may be coupled (via a cable or wireless connection) to the computer during that process.

Figure 3:
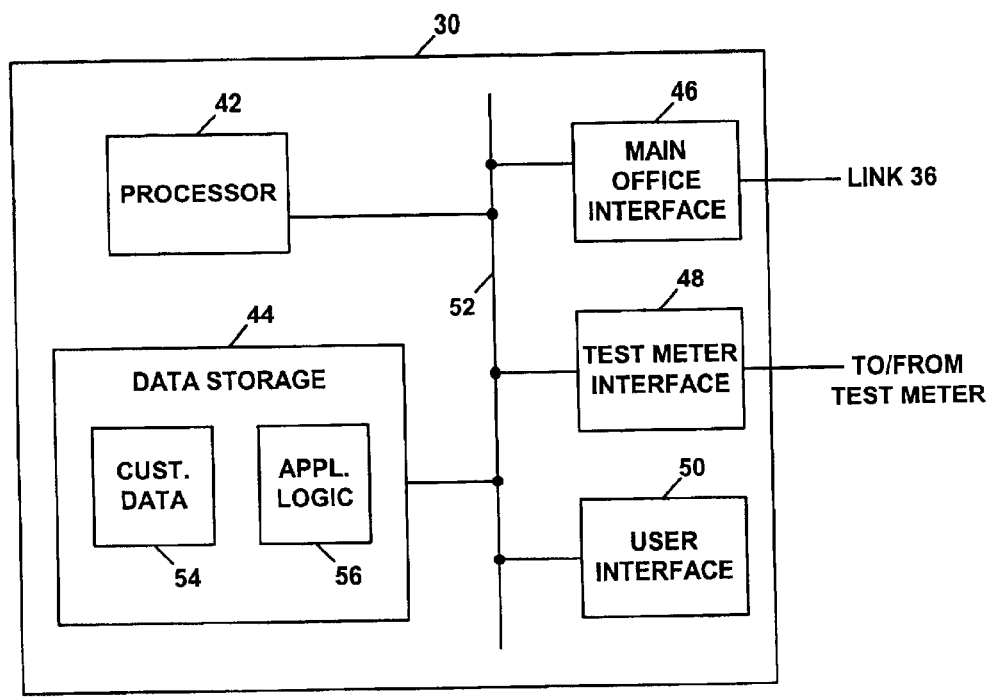
FIG. 3 is a block diagram showing example components of the computer depicted in FIG. 2.

Referring next to FIG. 3, a block diagram of an exemplary computer 30 is shown. As illustrated, exemplary computer includes a processor 42, data storage 44, a main office interface 46, a test meter interface 48 and a user interface 50, each of which may be coupled together via a system bus 52.

Processor 42 may be any computer processor, such as an Intel Pentium class processor for instance. Data storage 44 in turn may also take various forms, such as volatile and/or non-volatile memory, and/or magnetic or optical disk storage. In the exemplary embodiment, data storage may store customer-specific data 54 and application logic 56.

The customer-specific data may include customer-specific input records and customer-specific output records. In the exemplary embodiment, these records can take any of a variety of forms. By way of example, as noted above, each customer-specific input record may indicate (i) a customer identifier (e.g., account number), (ii) a street address and/or geographic coordinates where installation or maintenance is to be performed, (iii) a scheduled time for the work, and (iv) a downstream MMDS frequency that has been assigned to the site.

In turn, each customer-specific output report may set forth (e.g., in ASCII, comma-delimited form, or other suitable form) information such as (i) the customer identifier, (ii) location where measurements were taken, (iii), values of the measurements taken, and (iv) time when the measurements were taken. Further, an output record may also advantageously include other information. For instance, if measurement location is established through use of the global positioning system (GPS), the output record may include GPS metadata, which can assist in later analysis to determine if the GPS measured location coordinates were accurate. Additionally, the output record could include information, such as a serial number, that identifies the test meter used to perform the measurement(s). This information can facilitate tracking, so as to allow a later identification of all customers who were affected by a faulty test meter, for instance. The input and output records can take other forms as well.

Application logic 56 may include machine language instructions that are executable by processor 42 to carry out various functions described herein. Examples of those functions include (i) receiving and storing customer-specific input records, (ii) interfacing with a technician through user interface 50, such as to present the technician with a daily installation schedule and to receive user commands from the technician, (iii) producing and providing a control signal to test meter 32 via interface 48, to cause test meter 32 to take measurements at the customer site, (iv) receiving test results from the test meter via interface 48, (v) generating customer-specific output records, and (vi) reporting the customer-specific output records via main office interface 46 to the main office.

Main office interface 46 is an interface suitable for providing communication over link 36 with the main office. As such, main office interface 46 can take various forms, depending on the form of link 36 at computer 30. For example, if link 36 provides a simple PSTN connection, main office interface 46 might be a data modem with telephone port. As another example, if link 36 provides an Ethernet link to the Internet, main office interface 46 might be a suitable network interface module. And as another example, if link 36 provides a PCS wireless link, main office interface might be a PCS communication module (e.g., a PCMCIA card or other such module, or a discrete PCS device (e.g., cellular telephone) coupled with the computer).

Test meter interface 48 may also take various forms. In the exemplary embodiment, the test meter interface will be a standard I/O port on computer 30, such as a USB or serial port for instance. A cable connecting the port to the test meter may then have a proprietary or standard connection to the test meter. Alternatively, the test meter interface 48 may take other forms instead.

Similarly, user interface 50 may also take various forms. Preferably, user interface 50 will include a user output mechanism, such as a display and/or audio speakers, and a user input mechanism, such as a keypad/keyboard and/or a microphone. Other arrangements are also possible.

Figure 4:
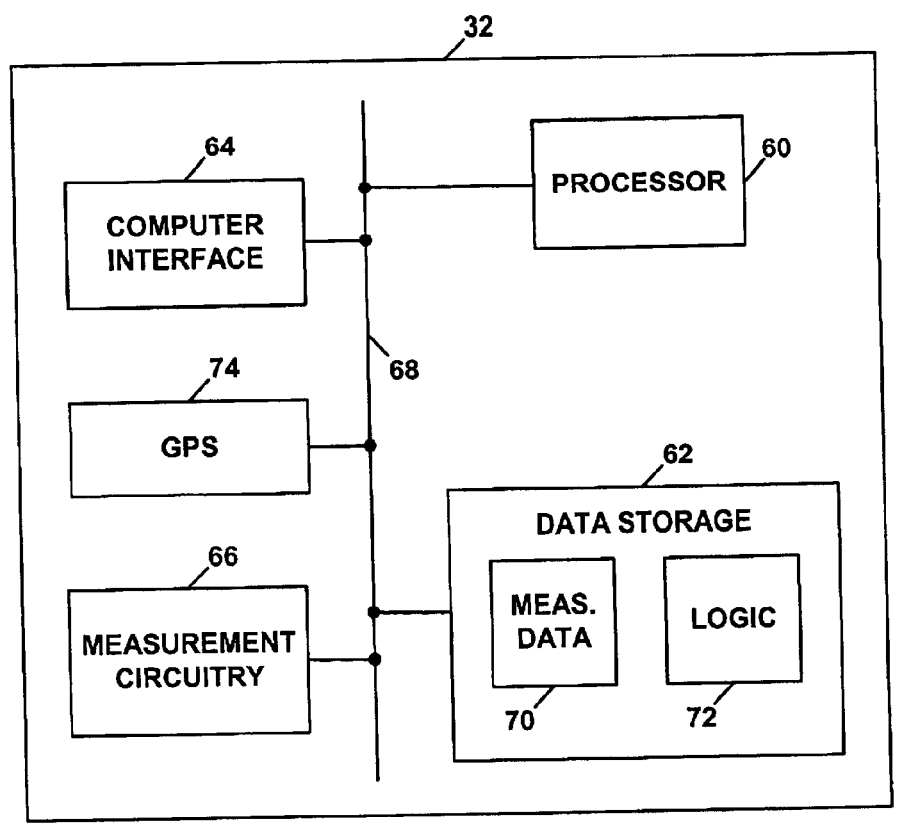
FIG. 4 is a block diagram showing example components of the test meter depicted in FIG. 2.

Referring next to FIG. 4, a block diagram of an exemplary test meter 32 is shown. As illustrated, the exemplary test meter includes a processor 60, data storage 62, a computer interface 64, and measurement circuitry 66, all coupled together by a system bus 68. As with computer 30, these various components may take a variety of forms to carry out the functions described herein.

In the exemplary embodiment, data storage 62 contains application logic 70 and measurement data 72. The application logic 70 is executable by processor 60 to carry out various functions described herein. For instance, the application logic may include macro scripts that have been provided to the test unit by computer 30 and that direct certain measurements to be taken (possibly at certain times). Further, the logic preferably functions to interface with measurement circuitry 66 so as to take the designated measurements (again, possibly at the designated times) and to thereby establish the measurement data 72. In turn, the logic may function to report the measurement data 72 to the computer, autonomously or upon request (e.g., in response to a query from computer 30).

Measurement circuitry 66 can in turn take various forms. Preferably, measurement circuitry 66 will include a coaxial cable port to facilitate a cable connection to an MMDS dish or other antenna that will receive signals to be measured. Alternatively, measurement circuitry 66 may itself include an antenna for receiving signals to be measured. In turn, the measurement circuitry includes a mechanism to measure the strength of received signals.

In addition, as shown in FIG. 4, the test meter may include a GPS receiver 74, which functions to obtain highly granular location information from a GPS satellite (not shown) in a manner well know to those of ordinary skill in the art. Through use of this GPS receiver, application logic 72 can record together with signal quality measurements a fairly precise indication of the location (e.g., latitude/longitude coordinates) where the signal quality measurements were taken. (Note that, alternatively or additionally, computer 30 could include or access a GPS transceiver and could itself record location information in conjunction with the measurement data 72 that the computer receives from the test meter. Still alternatively, location information can be acquired and recorded in other ways as well.)

Figure 5:
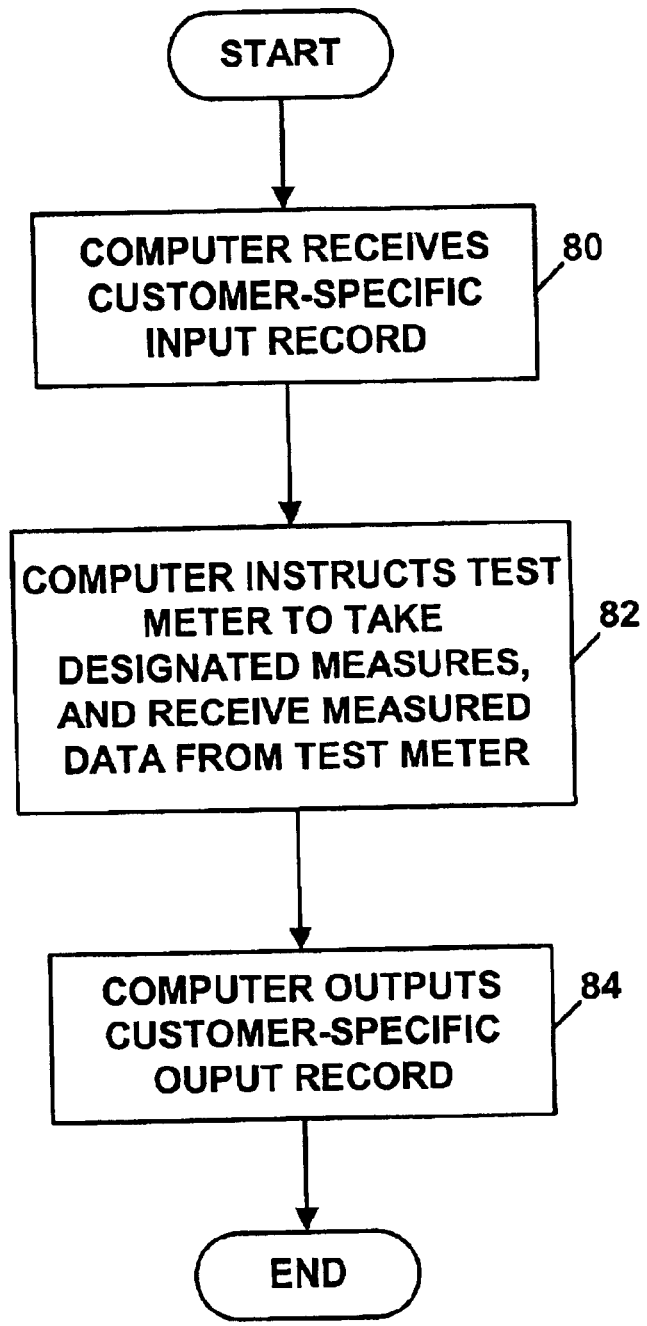
FIG. 5 is a flow chart depicting functions that may be carried out in accordance with the exemplary embodiment.

Referring next to FIG. 5, a generalized flow chart is provided to illustrate functions that may be carried out in accordance with the exemplary embodiment. As shown in FIG. 5, at block 80, a computer receives a customer-specific input record, which indicates at least one data point that is to be measured at a customer premises site. In turn, at block 82, the computer instructs a test meter to measure the data point(s) at the customer premises site and to then receive from the test meter a value of each data point as measured at the customer premises site. Thereafter, at block 84, the computer outputs a customer-specific output record, which indicates the value of the data point as measured at the customer premises site.

In accordance with the exemplary embodiment, a data point that is to be measured may be a signal strength at a downstream MMDS frequency to which the customer-premises site has been assigned. Alternatively, other data points are possible as well, whether or not they involve MMDS communications.

Figure 6:
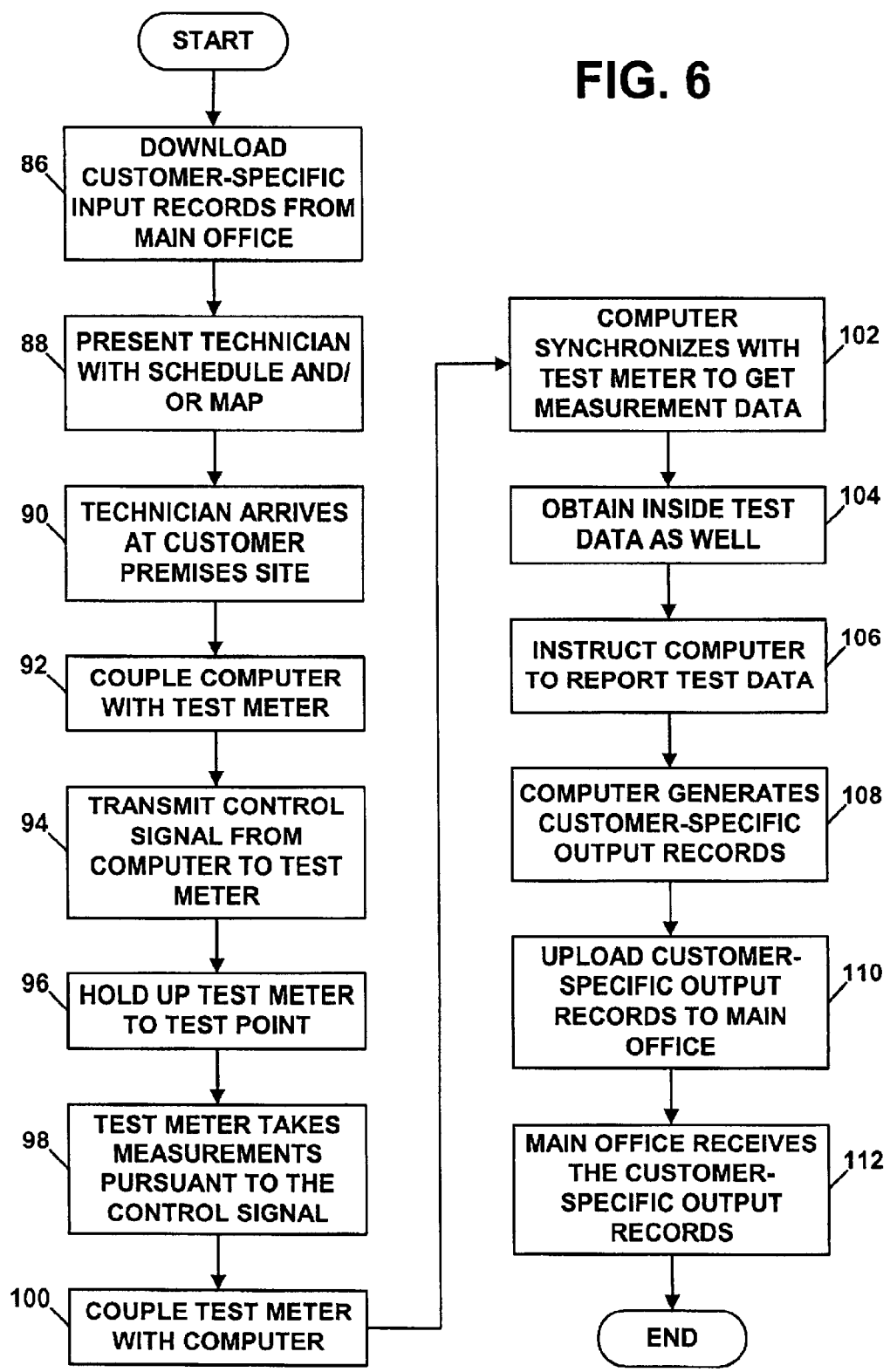
FIG. 6 is another flow chart depicting functions that may be carried out in accordance with the exemplary embodiment.

Referring next to FIG. 6, a more detailed flow chart is provided, to help further illustrate functional operation of the exemplary embodiment. It should be understood that the particular order of functions as set forth and described here (and in connection with other processes) can vary from that presented. Further, while some of the functions are described as being performed in response to technician input, it should be understood that some or those functions may be instead performed automatically by the computer and/or test unit. In fact, by automating many of these functions, the technician's performance can be better controlled and supervised, and the measurement and reporting quality can improve.

As shown at block 86 of FIG. 6, at the beginning of a work day, a technician causes computer 30 to download from main office 38 a set of customer-specific input records for the day. For instance, the technician can invoke a management application on the computer, which causes the computer to establish a network link with the remote access server at the main office. Through that link, the computer may provide the main office with a technician-ID, and the main office may then responsively send to the computer the customer-specific input records defining the technician's installation/maintenance appointments for the current day.

At block 88, the management application causes the computer to present to the technician a schedule of installation/maintenance appointments for the day and/or a map of where the technician should be throughout the day. In this regard, the computer can include a scheduling program and can programmatically associate the scheduled appointments with timeslots in that program. Further, the computer can include a mapping program, which functions to generate a pin-map (and perhaps a logical route) showing where the technician should be throughout the day. The computer may present the schedule and/or map to the technician via user interface 50.

At block 90, pursuant to the schedule and/or map, the technician then arrives at one of the customer-premises sites to perform installation and/or maintenance work. At block 92, the technician couples the computer with test meter 32 and instructs the management application to synchronize with the test meter. At block 94, the computer then responsively provides to the test meter a control signal directing that the test meter take and record particular measurements, possibly at a designated time (or when triggered by the technician or by some other triggering event).

In the exemplary embodiment, as indicated above, the control signal may be a macro or script that can be loaded into memory on the meter and executed by the meter so as to cause the meter to take one or more designated measurements. As such, the form and content of the control signal should take a form commensurate with the capabilities and expectations of the test meter. (For instance, if the test meter is capable of receiving and executing a Visual Basic or XML script, then the control signal could be a Visual Basic or XML script that encodes instructions to take particular measurements.)

By way of example, the control signal may be a signal that directs the test meter to measure signal strength at the downstream MMDS frequency assigned to the customer-premises site. Further, in a robust embodiment, the control signal may direct the test meter to conduct a series of measurements at that same downstream frequency, so that a "best" measurement can be later selected (thereby eliminating any questionable data.)

Preferably, the control signal includes an indication of the CPE, or some other indication that will correlate measurements taken by the test meter with the CPE or job for which the measurements were taken. For instance, the control signal could include the account number of the CPE.

At block 96, the technician then hooks the test meter up to an MMDS dish that is or will be positioned to receive signals at the customer premises site. As indicated above, for instance, the technician may hold a dish up to the position to be tested, on a long fiberglass rod, and may connect the test meter to a coaxial cable running from that dish. Or, if a dish is already installed, the technician may simply connect the test meter to a cable extending from that dish.

In turn, in response to the designated triggering event, the test meter then takes the specified measurements and records the measured values, as indicated at block 98. For instance, pursuant to the control signal provided by the computer, the test meter might take ten sequential measurements of downstream signal strength at the specified frequency. And the test meter will record the measurement data in data storage 62.

As indicated above, the test meter preferably records with each test measurement an indication of the measured value as well as a GPS-determined location and perhaps other useful data. Further, the test meter preferably records with each measurement an indication of the CPE or job for which the measurement was taken, using the identifying information that the computer had provided. For each measurement, and/or in response to a given control signal, the test meter may record all of this information in a single data set, which the test meter can thereafter readily provide to the computer.

At block 100, if the technician had uncoupled the computer from the test meter, the technician then re-couples the computer to the test meter. And at block 102, the technician again instructs the management application on the computer to synchronize with the test meter. As a result, the computer extracts or otherwise obtains the most current measurement data 72 from the test meter, through an agreed data query for instance. Thus, for example, if the test meter took ten measurements, then the computer might obtain from the test meter ten separate measurement data sets for the CPE or job, each indicating a measured value, and each preferably indicating GPS-location, and a time when the measurement was taken.

At block 104, the technician may also apply the test meter and/or other test equipment inside the building (e.g., house) where the CPE resides. In particular, referring back to FIG. 1, the technician may take signal quality measurements on the cable, at the point where the cable would attached to computer 20. Each such measurement may be taken in a manner similar to that described above or in some other manner. The resulting measurements may help to determine whether signal strength was acceptable at MMDS dish 18 and then degraded somewhere along the cable to computer 20.

Returning to FIG. 6, at block 106, the technician then instructs the management application to report customer-specific output data to the main office. In the exemplary embodiment, the technician could do this at the end of the day, for all locations that the technician visited during the day. Or the technician may do so per visit. Still alternatively, the computer may autonomously report the customer-specific output data to the main office.

In response, at block 108, the computer then establishes a customer-specific output record per site. As noted above, the customer-specific output record may include an indication of the CPE, as well as the measured data and corresponding location and time information. If the test meter had taken a series of measurements, then the management application may select value representing the strongest downstream signal quality. Or the management application may include multiple measures in the customer-specific output record. Further, the management application preferably includes in the customer-specific output record the measurement data that the technician obtained from within the building as well.

And at block 110, the computer then sends the customer-specific output record via link 36 to the main office. Thereafter, at block 112, the main office receives the customer-specific output record, and a computer or person may then compile and analyze the data.

An exemplary embodiment of the present invention has been described above. Those skilled in the art will understand, however, that changes and modifications may be made to this embodiment without departing from the true scope and spirit of the present invention, which is defined by the claims.

I claim:

1. A method of collecting radio frequency signal test data at a customer premises site, the method comprising:

receiving a customer-specific input record into a computer, the customer-specific input record indicating at least one radio frequency signal data point to measure at the customer premises site;

applying the computer to instruct a radio frequency signal test meter to measure the at least one data point at the customer premises site and to then receive from the test meter a value of the at least one data point as measured at the customer premises site; and outputting a customer-specific output record from the computer, the customer-specific output record indicating the value of the at least one data point as measured at the customer premises site.

2. A computer-readable medium having stored thereon instructions for causing the computer to carry out the method of claim 1.

3. A method of collecting radio frequency signal test data at a customer premises site, the method comprising:

receiving a customer-specific input record into a computer, the customer-specific input record indicating at least one radio frequency signal test data measurement to take at the customer premises site;

operating the computer to produce a control signal for causing a radio frequency signal test meter to take the at least one test data measurement;

providing the control signal from the computer to the test meter, wherein the test meter then takes the at least one test data measurement at the customer premises site, pursuant to the control signal;

providing from the test meter to the computer an indication of the at least one test data measurement; and outputting from the computer a customer-specific output record indicating the at least one test data measurement taken at the customer premises site.

4. The method of claim 3, wherein the at least one test data measurement to take at the customer premises site comprises a measurement of signal strength at a downstream frequency assigned to the customer premises site.

5. The method of claim 4, further comprising including in the customer-specific output record an indication of the geographic coordinates.

6. The method of claim 3, wherein the control signal comprises a macro executable by the test meter to cause the test meter to take the at least one test data measurement.

7. The method of claim 3, further comprising providing from the test meter to the computer an indication of geographic coordinates where the at least one test data measurement is taken at the customer premises site.

8. The method of claim 3, further comprising including in the customer-specific output record an identification of the test meter.

9. A method of collecting radio frequency signal test data from customer-premises sites, the method comprising:

loading into a computer a number of customer-specific input records, each indicating (i) a respective customer-premises site where radio frequency signal strength is to be measured and (ii) a respective radio frequency on which the respective customer-premises site has been assigned to receive wireless communications; and for each of the customer-specific input records, operating the computer (i) to instruct a radio frequency signal test-meter to measure received signal strength at the respective customer-premises site on the respective frequency, (ii) to receive from the test-meter measurement data indicative of the received signal strength at the respective customer-premises site, and (iii) to report the measurement data to a remote location via a communications link.

10. The method of claim 9, wherein operating the computer to report the measurement data to a remote location via a communications link comprises operating the computer to send the measurement data to the remote location via a communication path that comprises a wireless communications link.

11. The method of claim 9, wherein each customer-specific input record further indicates an appointment time when a technician is to be at the respective customer-premises site, the method further comprising:

operating the computer to present a schedule of appointment times at respective customer-premises sites throughout a day.

12. The method of claim 9, wherein each customer-specific input record indicates an address of the respective customer-premises site, the method further comprising:

operating the computer to present a map of respective customer-premises sites indicated by the customer-specific input records.

* * * * *